(12) United States Patent
Lampel et al.

(10) Patent No.: US 12,007,465 B2
(45) Date of Patent: Jun. 11, 2024

(54) RADAR APPARATUS AND METHOD WITH CONTENT EMBEDDED IN THE RADAR SIGNAL

(71) Applicant: NXP B.V., Eindhoven (NL)

(72) Inventors: Franz Lampel, Eindhoven (NL); Alessio Filippi, Eindhoven (NL)

(73) Assignee: NXP B.V., Eindhoven (NL)

( * ) Notice: Subject to any disclaimer, the term of this patent is extended or adjusted under 35 U.S.C. 154(b) by 227 days.

(21) Appl. No.: 17/505,434

(22) Filed: Oct. 19, 2021

(65) Prior Publication Data

US 2023/0121012 A1 Apr. 20, 2023

(51) Int. Cl.
| | |
|---|---|
| G01S 13/00 | (2006.01) |
| G01S 7/02 | (2006.01) |
| G01S 7/28 | (2006.01) |
| G01S 13/34 | (2006.01) |
| G01S 13/931 | (2020.01) |

(52) U.S. Cl.
CPC ............ *G01S 13/343* (2013.01); *G01S 7/023* (2013.01); *G01S 7/2813* (2013.01); *G01S 13/931* (2013.01)

(58) Field of Classification Search
CPC .... G01S 13/343; G01S 13/931; G01S 7/2813; G01S 7/023
See application file for complete search history.

(56) References Cited

U.S. PATENT DOCUMENTS

| | | |
|---|---|---|
| 3,798,590 A | 3/1974 | Jacobson et al. |
| 4,309,703 A | 1/1982 | Blahut |
| 4,333,080 A | 6/1982 | Collins et al. |
| 4,748,639 A | 5/1988 | Feggeler |
| 5,298,962 A | 3/1994 | Nourrcier |
| 5,678,554 A | 10/1997 | Hossack |
| 5,926,125 A | 7/1999 | Wood |
| 6,373,427 B1 | 4/2002 | Hohne |
| 6,825,800 B1 | 11/2004 | Dudley et al. |
| 6,828,933 B1 | 12/2004 | Doerry et al. |

(Continued)

FOREIGN PATENT DOCUMENTS

| | | |
|---|---|---|
| CN | 113176592 B | 9/2021 |
| WO | 2021053614 A2 | 3/2021 |

OTHER PUBLICATIONS

Bose, S., "Group Delay Engineering Using Cascaded All Pass Filters for Wideband Chirp Waveform Generation", 2013 IEEE International Conference on Electronics, Computing and Communication Technologies, Jan. 17-19, 2013.

(Continued)

*Primary Examiner* — Vladimir Magloire
*Assistant Examiner* — Remash R Guyah

(57) ABSTRACT

A method and apparatus are provided in which receiver circuitry and signal processing circuitry may reside. The receiver circuitry receives a FMCW radar signal having a content signal (e.g., a random or information signal) embedded into a radar waveform and indicating a relationship in the FMCW radar signal between beat frequency and time delay. The signal processing circuitry may apply a filter (e.g., filtering with a group delay that approximates or relates to the relationship) that causes a residual error in, due to dispersion of, the content signal, and may account for (e.g., mitigate) the residual error by introduction of a dispersion-related function in further processing of the content signal.

20 Claims, 6 Drawing Sheets

(56) References Cited

U.S. PATENT DOCUMENTS

| | | |
|---|---|---|
| 6,836,240 B1 | 12/2004 | Dubbert et al. |
| 6,999,733 B2 | 2/2006 | Hori et al. |
| 7,221,308 B2 | 5/2007 | Burton et al. |
| 7,818,079 B2 | 10/2010 | Vaananen et al. |
| 8,026,762 B2 | 9/2011 | Honcharenko |
| 8,140,106 B2 | 3/2012 | Chiba et al. |
| 8,290,458 B2 | 10/2012 | Safavi |
| 8,866,667 B2 | 10/2014 | Vacanti |
| 9,048,796 B2 | 6/2015 | Lozhkin |
| 9,246,523 B1 | 1/2016 | Stopler et al. |
| 9,494,675 B2 | 11/2016 | McCorkle |
| 9,660,605 B2 | 5/2017 | Tinsley et al. |
| 9,762,350 B2 | 9/2017 | Stopler et al. |
| 9,853,365 B2 | 12/2017 | Kumar et al. |
| 10,613,193 B2 | 4/2020 | Kim et al. |
| 10,623,118 B2 | 4/2020 | Lagoy et al. |
| 2002/0198650 A1 | 12/2002 | Baugh et al. |
| 2005/0156780 A1 | 7/2005 | Bonthron et al. |
| 2009/0309780 A1 | 12/2009 | Albert et al. |
| 2011/0122014 A1 | 5/2011 | Szajnowski |
| 2011/0187586 A1 | 8/2011 | Cornic et al. |
| 2013/0050013 A1 | 2/2013 | Kobayashi et al. |
| 2013/0214963 A1 | 8/2013 | Vacanti |
| 2016/0124075 A1 | 5/2016 | Vogt et al. |
| 2016/0245909 A1 | 8/2016 | Aslett et al. |
| 2017/0219689 A1 | 8/2017 | Hung et al. |
| 2018/0003799 A1 | 1/2018 | Yang et al. |
| 2018/0031688 A1 | 2/2018 | Hesse et al. |
| 2018/0074168 A1 | 3/2018 | Subburaj et al. |
| 2018/0095162 A1 | 4/2018 | Fetterman et al. |
| 2018/0095173 A1 | 4/2018 | Kurono |
| 2018/0113191 A1 | 4/2018 | Villeval et al. |
| 2018/0136328 A1 | 5/2018 | Moss |
| 2018/0306913 A1 | 10/2018 | Bartels |
| 2019/0120933 A1 | 4/2019 | Kurashige |
| 2019/0361113 A1 | 11/2019 | Ray |
| 2020/0110146 A1 | 4/2020 | Barker et al. |
| 2020/0256948 A1* | 8/2020 | Jansen .................... G01S 13/34 |
| 2021/0173070 A1 | 6/2021 | Cherniak et al. |

OTHER PUBLICATIONS

Chen, D., "A Group Delay Compensation Power Amplifier with Auto Power Level Control for 24GHz FMCW Automobile Radar Application", 2018 IEEE/MTT-S International Microwave Symposium—IMS, Jun. 10-15, 2018.

Furstenberg "Phase Correction of Interferograms Using Digital All-Pass Filters", University of Illinois Department of Physics, https://doi.org/10.0003702053585345, Mar. 1, 2005.

Kates, J., "Principles of Dynamic-Range Compression", published in Trends in Amplification, vol. 9, No. 2, Mar. 1, 2005.

Final office action dated Apr. 1, 2022 in U.S. Appl. No. 16/865,824.

F. Lampel, R.F. Tigrek, A. Alvarado, F.M.J. Willems, "A Performance Enhancement Technique for a Joint FMCW RadCom System", European Radar Conference, Paris, France, Oct. 2019.

P. Barrenechea, F. Elferink and J. Hanssen, "FMCW Radar with broadband communication capability", Proc. of the $4^{th}$ European Radar Conference, Munich, Germany, Oct. 2007, pp. 130-133.

Z. Zhang, M. J. Nowak, M. Wicks, and Z. Wu, "Bio-inspired RF steganography via linear chirp radar signals", IEEE Communications Magazine, Jun. 2016, vol. 54, No. 6, pp. 82-86.

C. Sahin, J. Jakabosky, P. M. McCormick, J. G. Metcalf and S. D. Blunt, "A novel approach for embedding communication symbols into physical radar waveforms", Proc. 2017 IEEE Radar Conf., Seattle, WA, USA, May 8-12, 2017, pp. 1498-1503.

R. Feger, H. Haderer and A. Stelzer, "Optimization of codes and weighting functions for binary phase-coded FMCW MIMO radars", Proc. IEEE Mtt-S Intl. Conf. on Microwaves for Intelligent Mobility, San Diego, CA, USA, May 19-20, 2016.

Non-final office action dated May 27, 2022 in U.S. Appl. No. 16/865,824.

Notice of Allowance dated Sep. 16, 2022 in U.S. Appl. No. 16/865,824.

Non-Final office action dated Dec. 27, 2021 in U.S. Appl. No. 16/865,824.

U.S. Appl. No. 16/865,824, filed May 4, 2020, entitled: Predistortion Technique for Joint Radar/Communication Systems. The Examiner is referred to the copending patent prosecution of the common Applicant (no attachment).

Non-Final Rejection for U.S. Appl. No. 16/272,083, 15 pgs. (dated Apr. 29, 2021).

Notice of Allowance for U.S. Appl. No. 16/272,083, 8 pgs. (dated Aug. 16, 2021).

* cited by examiner

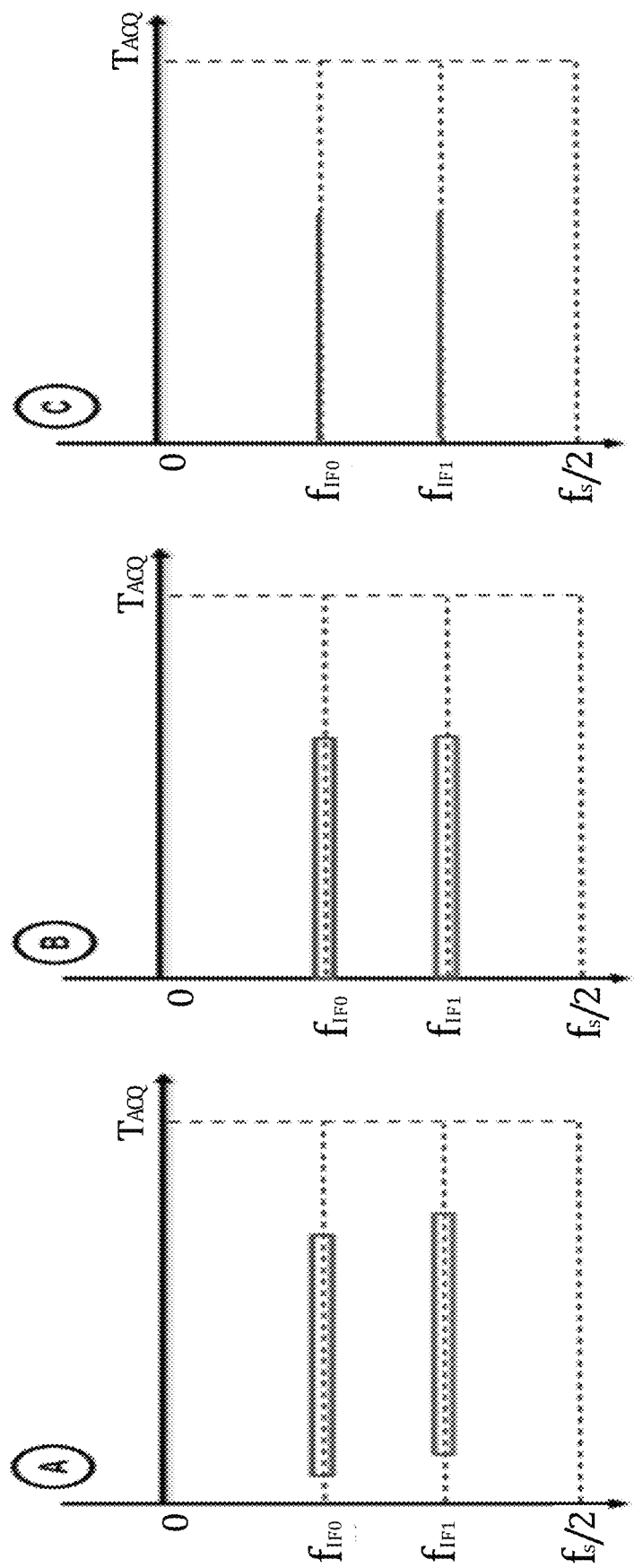

RADAR APPARATUS AND METHOD WITH CONTENT EMBEDDED IN THE RADAR SIGNAL

OVERVIEW

Various embodiments are directed to radar-based circuits, as may involve embedding information within a radar signal.

Radar systems are utilized in a variety of applications for ascertaining environmental characteristics, such as those which may relate to distance, position or speed. For instance, automotive and other vehicle systems may utilize radar to ascertain distance between a vehicle using the radar and objects and/or other vehicles. Generally, the distance that a radar signal, such as sound, light or other radiation, travels is used to characterize the environment. A round-trip distance that a radar signal travels from a transmitter to an object and (as reflected from the object) back to a receiver can be determined based upon characteristics of the signal and the medium in which the signal travels.

Using an automobile as an example, a signal can be modulated according to a specific waveform principle (e.g., a frequency modulated continuous wave (FMCW) signal). Such a signal may be transmitted at a predetermined carrier frequency, and reflected signals can be detected and used to determine a distance to an object. The transmission frequency of a continuous radar signal may be modulated in the form of ramps, and a baseband signal can be generated from a received signal by mixing with the transmitted signal. Such approaches can be used, for example, for sensing distance to an object, or sensing a velocity at which an object or vehicle is moving, as well as relative positioning (e.g., an angle between an object and a vehicle).

In the case of advanced driver assistance systems (ADAS), for example, sometimes radar sensing as well as information exchanges are used to allow decision making in rapidly-changing and complex environments. To accommodate such information exchanges, additional frequency spectrum has been used but this may result in congestion and interference in spectrum being otherwise allocated. For this reason and as an alternative to using additional frequency spectrum, radar-based signaling may involve embedding information within a radar signal.

While such approaches have been very useful, many radar systems, high resolution and long measurement range can be challenging to achieve. Further, many environments benefit from the communication of data within signals. However, data communication with radar signals can be challenging to implement, while also maintaining desirable radar operation. For instance, data may complicate a radar signal, making the radar signal challenging to process.

These and other matters have presented challenges to radar-based implementations, for a variety of applications.

SUMMARY

Various example embodiments are directed to issues such as those addressed above and/or others which may become apparent from the following disclosure concerning radar systems, radar circuitry and the like.

In certain example embodiments, the present disclosure is directed to an apparatus and/or method involving receiver circuitry to receive a FMCW radar signal having a content signal embedded into a radar waveform and having a relationship between beat frequency and time delay, and involving signal processing circuitry that applies a filter (e.g., to account for the time delay) that causes a residual error in, due to dispersion of, the content signal and to account for the residual error by introduction of a dispersion-related function in further processing of the content signal.

In certain other related example embodiments, aspects of the present disclosure are directed to apparatuses (e.g., systems, assemblies, circuits, devices, etc.) and methods involving radar receiver circuitry for receiving a FMCW radar signal, and to the operations of signal processing circuitry processing a content signal embedded into the received radar waveform and calculating a relationship, manifested and indicated via the received FMCW radar signal, between beat frequency and time delay. In specific exemplary embodiments, the embedded content signal may be initially processed (e.g., to align the content signal in time) at the radar receiver by applying a filter such as with a group delay function that approximates the relationship between the beat frequency and time delay. This initial processing causes a residual error being introduced to the content-filtered radar signal. However, as this error may be independent of an intermediate frequency of the received signal, in certain specific embodiments this independence is used to similarly affect, via a dispersion of, the reference content signal (e.g., base frequency of zero Hertz) of the embedded content signal before using the reference signal to remove the embedded (dispersed) content signal.

In a more specific example embodiment, a method involves a related apparatus in which such receiver circuitry and signal processing circuitry may reside. Via the receiver circuitry, the method includes receiving a FMCW radar signal having a content signal embedded into a radar waveform and indicating a relationship in the FMCW radar signal between beat frequency and time delay. The method may further include, via the signal processing circuitry, dispersing the reference signal of the embedded content signal before using the reference signal to remove the embedded (dispersed) content signal.

In more-specific examples, the above-characterized aspects may optionally include and be built on as follows. The content signal may refer to or include at least one or combination of the following: an information signal; a random signal; and a signal to maintain robustness of the receiver in presence of interference. The signal processing circuitry may also account for the residual error and/or the dispersion, by dividing the received FMCW radar signal by a dispersed version of a reference signal corresponding to the content signal, and the signal processing circuitry may then carry out further radar signal processing of the received FMCW radar signal. As may be appreciated, the content signal may be embedded into a radar waveform by phase modulation.

In yet further specific examples, the apparatus and/or method may include an all-pass filter performed by the signal processing filter (e.g., as part of an alignment process) in the time domain.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 6A, 6B and 6C depict spectrograms of processed radar signals associated with an embedded information signal, as deramped after different processing steps, in accordance with another example of the present disclosure, with FIG. 6A showing the two signals in the frequency spectrum, FIG. 6B showing the time delays being equalized, and FIG. 6C showing the information signal being removed.

Figure 1:
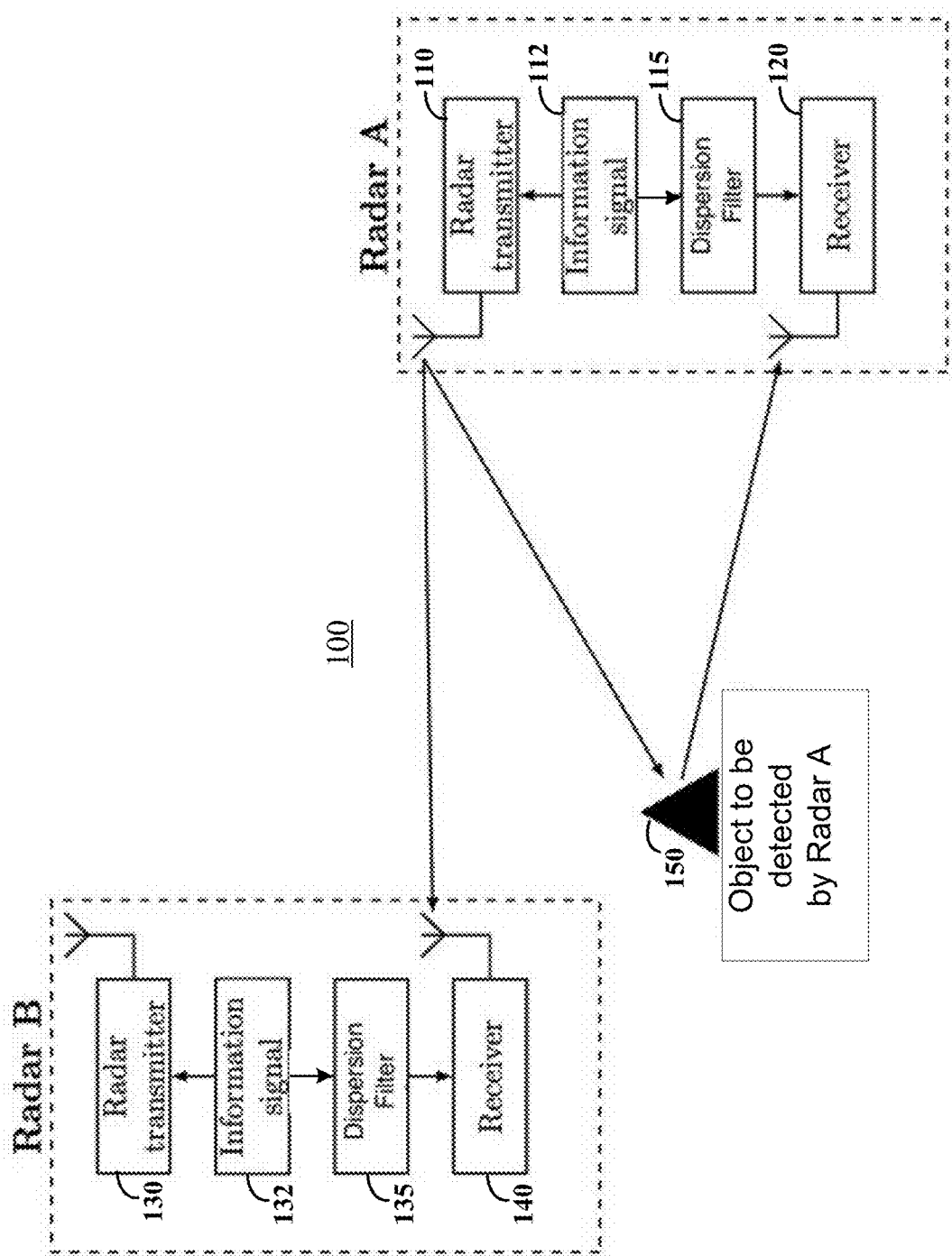
FIG. 1 shows a system-level diagram illustrating an example radar-communication apparatus and approach, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving reception of radar signals. In certain implementations, aspects of the present disclosure have been shown to be beneficial when used in the context of communicating data with radar signals, and in the context of detecting distance (e.g., to a remote object) from the radar signals. In various embodiments, content such as information is embedded in radar signals and transmitted for reception by remote receivers. A reflected one of the radar signals, which may be received back at the source that transmitted the one of the radar signals, is filtered to remove the data prior to processing the radar signal for detecting distance relative to the reflecting object. Such approaches may, for example, facilitate vehicle-to-vehicle and/or station-to-vehicle communication for detecting objects accurately, for example, even when the distance of the object is significant and the reflected signal is received in the midst of noise and other types of interference. While not necessarily so limited, various aspects may be appreciated through the following discussion of non-limiting examples which use exemplary contexts.

As may be implemented in accordance with one or more embodiments, a combined radar and communication system embeds an information signal into a radar waveform, and further filters the information signal from a reflection of the radar waveform from an object. Such an approach may involve filter processing that exploits a relationship between beat frequency and time delay in a FMCW radar system.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination. Also, throughout discussion in the present disclosure, it will be appreciated that in connection with discussing certain activities applied to a signal, the same signal may be referred to after being processed via such activities; e.g., a received (content-modulated) radar signal may be first filtered to remove aspects of the signal and then the (filtered) received radar signal may be further processed with reference given such further-processed signal as being the received radar signal or the filtered received radar signal.

In certain specific examples, the present disclosure is directed to a radar system including, for example, a radar receiver and a radar transmitter (aka, radar transceiver) and signal processing associated/integrated with parts of the radar transceiver, and in other examples, directed to apparatuses including, and/or methods involving, use of a radar receiver and of certain signal processing associated/integrated with the radar receiver. In each of these examples, receiver circuitry and signal processing circuitry of the apparatus may be characterized as follows. The receiver circuitry is to receive a FMCW radar signal having a content signal embedded into a radar waveform and manifesting a relationship between beat frequency and time delay. The signal processing circuitry may apply a filter (e.g., to account for the time delay) that causes a residual error in, due to dispersion of, the content signal and then accounting for the residual error by introduction of a dispersion-related function in further processing of the dispersed content signal. For example, the further processing of the content signal may be in the form of applying a corresponding delay correction, as applied to account for the time delay, to the reference communication signal, and/or such further processing may be to account for the dispersion effect by dividing or separating the received signal by the dispersed reference communication signal.

In a more specific embodiment, the above-characterized apparatus may further include circuitry (e.g., similar to the signal processing circuitry or referring to another aspect of the signal processing circuitry itself) for carrying out further radar signal processing of the received FMCW radar signal.

The above-characterized aspects may include and may build on the above-described example aspects by way of the following discussion of more-specific examples and implementation aspects. Firstly, in related and more-specific examples, the apparatus may further include or involve an all-pass filter that is associated with a group delay that approximates or relates to the relationship between beat frequency and time delay. Such an all-pass filter may have or be associated with a linear group delay and/or a linear group delay and/or be associated with a nonlinear response which causes dispersion of the communication signal in an alignment process associated with the signal processing circuitry.

In certain other specific examples (which may also build on the above-described aspects), the content signal may not refer to or include an information signal. In this context, the term information signal is exemplified by data that is transmitted to inform by interpretation of the data at the receiving end of a communication path. In one such example, the content signal may be phase modulated into the FMCW signal as an information signal, for example, as encoded data to be decoded by circuitry associated with or linked to the radar receiver. In another example, the content signal may be a random signal and/or a signal to maintain robustness of the receiver in presence of interference. For instance, the content signal may be embedded into a radar waveform by continuous phase modulation to relax power amplification requirements and to reduce bandwidth demand.

In yet another example, the content signal may include a combination of these, thereby providing information and also, through a random or other signal, maintain robustness of the receiver in the presence of interference.

As exemplified in other specific embodiments, the signal processing circuitry may be implemented to carry out the above filtering operation by use of an all-pass filter that is associated with a group delay that approximates or relates to the relationship between beat frequency and time delay, and the signal processing circuitry may account for this time delay by mitigation or removal of the time delay, and similarly in certain instances may account for the residual error by mitigation or removal of the residual error.

Also in accordance with the present disclosure, certain exemplary methods may use the above systems, apparatus and/or circuits by carrying out one or more actions (or steps). As discussed somewhat above, one such exemplary method includes a related apparatus in which such receiver circuitry and signal processing circuitry may reside. Via the receiver circuitry, the method includes receiving a FMCW radar signal having a content signal embedded into a radar waveform and indicating a relationship in the FMCW radar signal between beat frequency and time delay. The method may further include, via the signal processing circuitry, using a filter that causes a residual error in, due to dispersion of the content signal and accounting for the residual error by introduction of a dispersion-related function in connection with further processing in the receive-signal circuit path of the radar (e.g., by further processing of the (dispersed) content signal).

In more-specific examples, the above-characterized methodology may optionally include further actions as follows. The content signal may refer to or include at least one or combination of the above discussed aspects (e.g., an information signal or a random signal to maintain robustness of the receiver in the presence of interference). Further, the method may include the signal processing circuitry removing the embedded content signal after effecting its alignment through use of an all-pass filter that has a linear group delay, and, in response to the embedded content signal being removed, the signal processing circuitry may carry out further radar signal processing of the received FMCW radar signal.

Turning now to the drawing, FIG. 1 shows a system-level diagram illustrating an example radar-communication system 100 with two or more radar communication devices, such as Radar A and Radar B, each of which is similarly-constructed according to aspects of the present disclosure.

Using Radar A as a representative example, its circuitry may include an example radar transmitter 110 and radar receiver 120. In one example embodiment, the radar receiver 120 may be designed to operate and be used independently of any particular radar transmitter. Such purposes/uses may include testing and various radar reception purposes (e.g., calibration and feature updates). The radar receiver 120 with its ensuing processing circuitry, includes content-signal or information-signal processing block 112 and dispersion filter block 115, may also be used with the remaining aspects illustrated in FIG. 1.

The signal flow arrows from Radar B, to Radar A to an object 150 and back to Radar B, as shown in FIG. 1, depict a scenario where Radar A wants to sense the environment and detect the object while communicating with Radar B simultaneously. In such a system, the information signal typically degenerates the radar performance of Radar A. As discussed herein, various aspects of the present disclosure involve circuitry and a technique to suppress this loss of performance efficiently. While the signal modulating the radar waveform could be an information-type (communication) signal or different kind of signal (as discussed above), in connection with other more-specific examples discussed hereinbelow, the content signal modulating the radar waveform may be considered a random signal used to increase the robustness of the radar to reduce interference.

The system 100, as implemented with the radar transmitter 110 and receiver 120, may use the radar transmitter 110 to embed a content signal (e.g., an information signal or a random signal) into a radar signal that is transmitted as shown. When the radar signal reflects off of an object 150, the receiver 120 detects the reflection and a filter circuit 115 may be used to process the information signal from the reflected signal before the receiver 120 further processes the reflection to ascertain distance to the object.

The signal transmitted by the radar transmitter 110 can further be detected by a remote receiver for communicating the embedded information signal therein. For instance, the radar transmitter 110 (at Radar A) may communicate with another radar (Radar B) having a receiver 140 configured to receive the radar signal and extract the embedded data therefrom. The other radar may similarly include a radar transmitter 130 that also embeds information signal 132 into radar transmissions, with the receiver 140 being configured to remove the embedded information signal from reflections of the radar transmissions for ascertaining object distance. Further included in each radar is a similarly-configured (dispersion) filter (dispersion filter 115 in Radar A or 135 in Radar B) which is used to enhance performance in connection with processing of the received radar signal after efforts are made to align (in time) the embedded information signal which is modulated onto the radar signal.

It should be appreciated that certain embodiments of the present disclosure are directed to an apparatus/system including both Radar A and Radar B. In certain contexts, the respective radars are implemented in vehicles for vehicle-to-vehicle communication and detection of objects such as object 150. In various contexts, the apparatus 100 acts simultaneously as a radar device and a communication device in which loss of radar performance is due to degeneration by an embedded information signal is mitigated.

Related exemplary aspects are directed to compensation scheming that exploits the correspondence or relationship between the beat frequencies at the baseband frequency (proportional to the round-trip delays). This correspondence is indicated by the radar receiver's received FMCW radar signal which manifests (or indicates a relationship) received FMCW radar signal between the beat frequency and time delays (associated with such round-trip delays to/from the object). For example, in connection with such compensation scheming, there may be an attempt to account for a time delay due to this relationship, and involvement of a distortion technique achieved by causing dispersion of the reference communication signal to facilitate the removal of the communication signal and any of its related interference from the radar signal.

Using the context and signals discussed above in connection with FIG. 1, the following discussion may provide a better understanding of exemplary signal processing, according to further examples and aspects of the present disclosure, and by way of certain non-limiting mathematical expressions and simulated experiments used in connection with radar performance validation in connection with certain more-detailed/experimental embodiments.

In connection with such an example experimental context and embodiment, a joint radar and communication signal (e.g., as an example of a content signal) may be used where the transmitted complex analytic signal is:

$$S_{TX}(t) = \sqrt{P_{Tx}} \exp(j(\theta(t) + \psi(t))) rect\left(\frac{t}{T}\right).$$

The expression $\theta(t)$ is the linear frequency modulated (LFM), also referred to as a chirp, and describes the instantaneous phase of the radar signal and is given as:

$$\theta(t) = 2\pi\left(f_c t + \frac{\alpha}{2}t^2\right),$$

where $\alpha = B/T$ is the slope of the LFM signal, B is the RF frequency deviation, and T is the signal's duration. Thus, the LFM signal can be considered a time-dependent carrier of the embedded phase modulated communication signal $\psi(t)$ (sawtooth carrier).

The radar signal may be available to the transmitter and the receiver, and the communication signal may be added to the radar signal before transmission, i.e., a joint radar and communication signal is transmitted. Further, the communication signal $\psi(t)$ in this example is embedded into the radar signal by phase modulation circuitry as is known.

As also known, many automotive radars apply a process referred to as deramping, stretch processing, in which the received signal are mixed with the transmitted signal in the receiver. The mixing process translates the round-trip time of a reflected signal to a sinusoidal signal with a frequency proportional to the round-trip time. While not required, the circuit embodiments referring to such deramping, and in connection with this and related examples, use only the radar signal (without embedded communication).

Further, in this example involving reception of FMCW radar signals, every single chirp is sampled within an acquisition time. The starting point of the acquisition window is chosen so that the baseband signal is present in the whole acquisition time $T_{acq}$, i.e., $t \in [\tau_{max}; T]$, where $\tau_{max}$ depends on the sampling frequency and the slope $\alpha$. The overall acquisition time $T_{acq}$ is therefore given as $T_{acq} = T - \tau_{max}$. During one acquisition time, N samples are recorded of the deramped chirp. The radar transmits a sequence of M chirps to perform Doppler processing, where each chirp carries an independent information sequence. Also, every chirp is sampled and stored in a matrix (e.g., although not illustrated such a memory array may be integrated and accessible to the signal processing circuitry) such that the mth row contains the N samples of the mth chirp. The elements of the matrix for a single target are given as (by neglecting the amplitude):

$$y[m, n] = \exp\left(j\left(-2\pi\left(\frac{f_B + f_D}{f_s}n + f_D m\right) + \psi\left(\frac{n}{f_s} - \tau\right) + \gamma\right)\right) + w(m, n),$$

where $f_B$ is the beat frequency, $f_D$ is the Doppler frequency, $\gamma$ is the residual phase comprising all constant phase terms, and $w(m, n)$ is additive white Gaussian noise.

The above equation shows that the received signal for a single point target may refer or correspond to the delayed communication signal modulated to a particular intermediate frequency. The intermediate frequency of the signal is given by the range dependent beat frequency and the Doppler frequency:

$$f_{IF} = f_B + f_D$$

Removal of the communication signal can be done by multiplying the received signal with the complex conjugate of the delayed communication signal. However, if multiple targets at different distances are present, the received signal contains a sum of differently delayed communication signals with different intermediate frequencies. Multiplication with the complex conjugate communication signal can therefore not remove the communication signal. On the other hand, if all communication signals would have the same delay, compensation could be done for multiple targets.

One principle associated with certain FMCW radars with stretch processing is that a time delay translates to a beat frequency. The relation between $f_B$ and $\tau$ is $$f_B = \alpha \cdot \tau.$$

In such examples, the beat frequency may be assumed to dominate the intermediated frequency of the signal. This effect or assumption can be exploited to align the communication signal by correcting the delay according to the intermediate frequency. Therefore, an all-pass filter is applied to the received signal with a linear group delay.

In automotive radars, the transmitter and receiver are co-located. Thus, the receiver has access to the embedded communication signal and can use it to remove the communication signal from the received signal. Also, radar processing takes place after all chirps have been collected. Therefore, it is possible to perform the alignment in the frequency domain by multiplying the discrete Fourier transform (DFT) of the sampled chirp with the DFT of the all-pass filter. Moreover, shifting data (e.g., circularly through memory and/or logic elements) forth and back in time is also possible.

The group delay of the filter to compensate for the round-trip time $\tau$ is given as $$\tau_{gr}(\omega) = -\frac{\omega_{IF}}{2\pi\alpha}.$$

where the corresponding phase response $H(\Omega)$ of the filter can be obtained from the relationship:

$$-\frac{d\angle H(j\omega)}{d\omega} = -\frac{\omega}{2\pi\alpha}$$

which results in $$\angle H(j\omega) = \frac{\omega^2}{4\pi\alpha} + k,$$

where k is a constant that can be set to 0. Such simulated experimentation, involving graph plotting of the phase response and its corresponding group delay evidences a group delay which is linear relative to the phase response.

Figure 2:
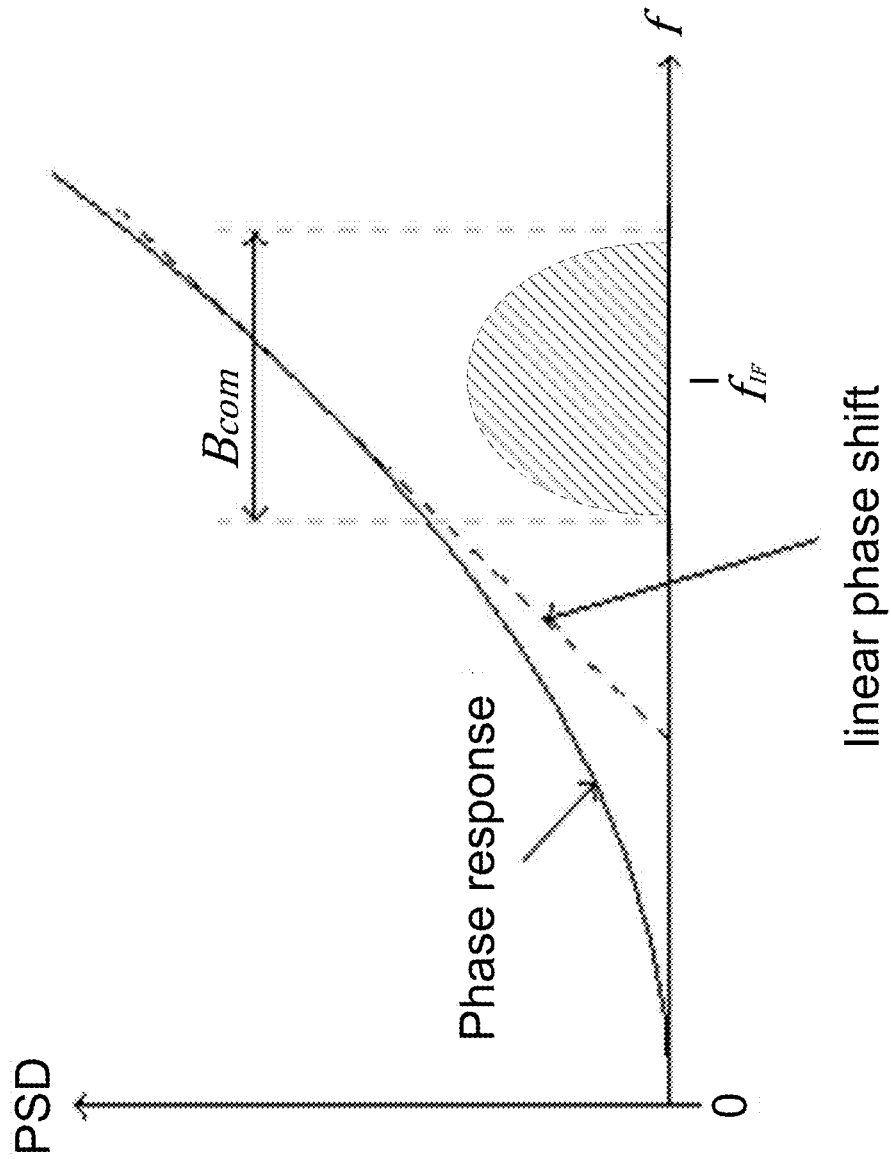
FIG. 2 shows a power spectral density graph or plot of a communication signal and an applied phase response of an exemplary filter used in connection with one example implementation according to aspects of the present disclosure, where the communication signal is embedded in the radar signal.

Accordingly, the phase response is not linear, and in such context, filtering a signal with this filter will cause dispersion. FIG. 2 depicts this effect by showing a power spectral density (PSD) of a communication signal with bandwidth $B_{com}$ centered at an intermediate frequency $f_{IF}$. The solid line indicates the phase response of the filter applied to the signal. The dashed line shows the required linear phase to shift the signal according to its intermediate frequency. The phase response deviates from the linear phase as the bandwidth $B_{com}$ increases.

The deviation can be studied by expressing the phase response as a Taylor series about point $\omega_0$ which is given as:

$$\angle H(j\omega) = \frac{\omega_0^2}{4\pi\alpha} + \frac{\omega_0}{2\pi\alpha}(\omega - \omega_0) + \frac{1}{4\pi\alpha}(\omega - \omega_0)^2,$$

where the first term is a constant term depending on the point $\omega_0$, the second term is linear and causes the desired shift of the signal, and the last term describes the unwanted dispersion of the signal. Note that the coefficient of the last term is independent of $\omega_0$. The independence implies that all signals experience the same dispersion after filtering.

The corresponding Taylor expansion of the phase response (not shown) may be plotted for two different frequencies for comparison to illustrate that the phase dispersion is the same in both cases. One plot may be used for showing an approximation of the phase response by using the first two terms, and another plot for showing the unwanted dispersion.

Figure 3A:
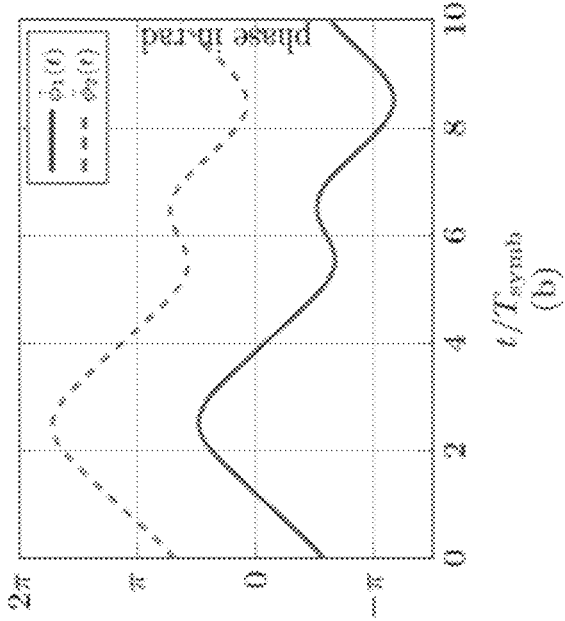
FIGS. 3A, 3B and 3C show plots of phase versus time processing of two differently delayed communication signals, in accordance with another example of the present disclosure, with FIG. 3A showing processing before alignment, FIG. 3B showing processing after alignment, and FIG. 3C showing processing after equalization.
Figure 3B:
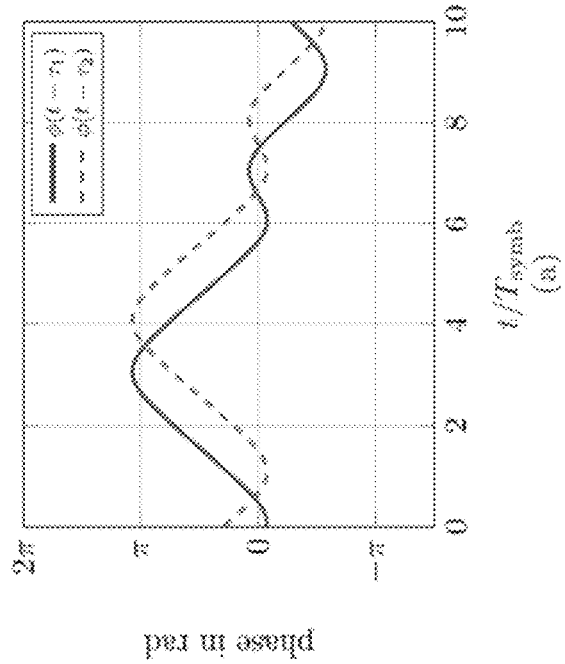
Figure 3C:
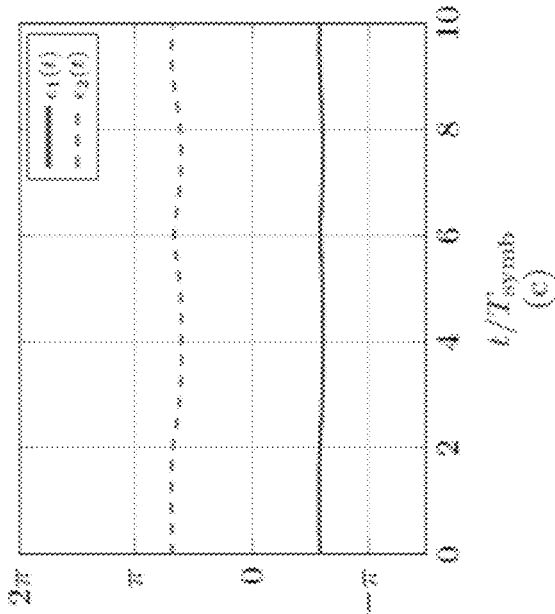

The effect of the dispersion on the communication signal is shown in FIGS. 3A, 3B and 3C. FIG. 3A depicts two differently delayed communication signals. For simplicity, only the delayed baseband communication signals are shown by neglecting their different intermediate frequencies. The upper dashed line has a greater delay and, therefore, also a higher intermediate frequency. In this example, the communication signals after aligning are shown in FIG. 3B, and the equalized signals are shown in FIG. 3C. Ideally, the equalized signal should be a constant, which is not true due to the dispersion.

The fact that the dispersion is independent of the intermediate frequency of the communication signal can be used to distort the communication signal, which is used to remove the communication signal from the received signal. Therefore, the identical alignment technique is applied to the reference communication signal at the receiver.

Since the reference communication is located at f=0, the signal is not shifted. However, the reference communication signal is dispersed in the same way as the communication signal is embedded in the received signal.

Figure 4:
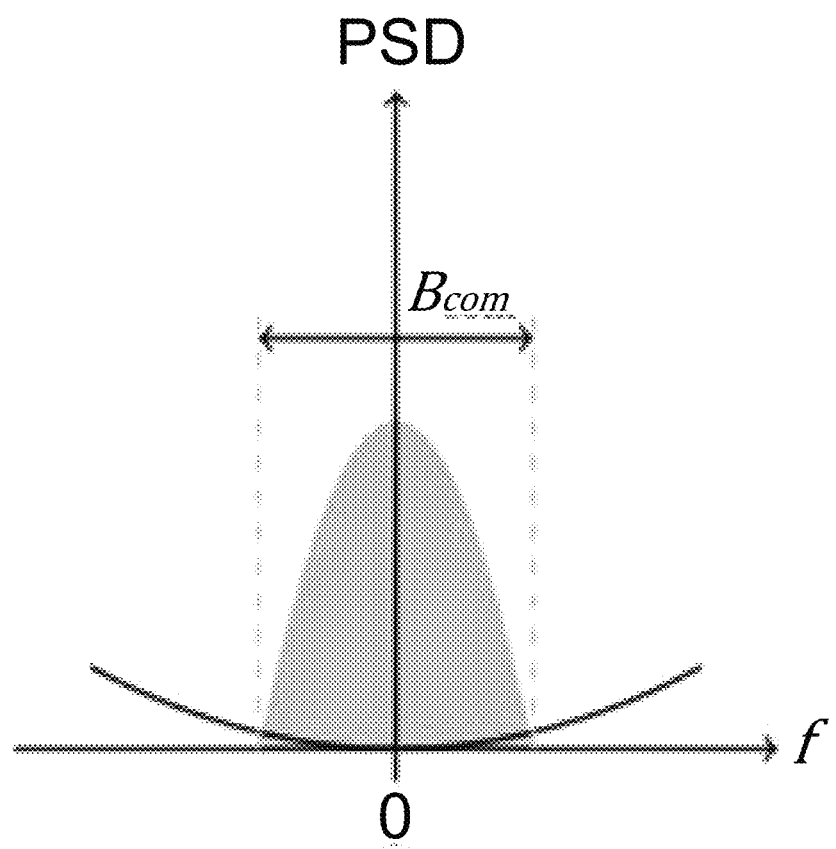
FIG. 4 is a plot showing dispersion of a reference communication signal in an example implemented in accordance with the present disclosure.

FIG. 4 is an illustrative plot showing dispersion of a reference communication signal in an example implemented in accordance with the present disclosure. The embedded communication signal and the reference communication signal are identically dispersed.

In one example, the embedded communication signal with the dispersion effect may be accounted for (e.g., mitigated or completely removed) from the received signal by dividing or separating the received signal by the dispersed reference communication signal. In other examples, the embedded communication signal may be accounted for (e.g., again by mitigating or removing completely) using more complex processing such as by first introducing/mixing in another signal and then removing the other signal with another process that may occur before, after or concurrently with such removal (e.g., by division or separating of the received signal).

Figure 5:
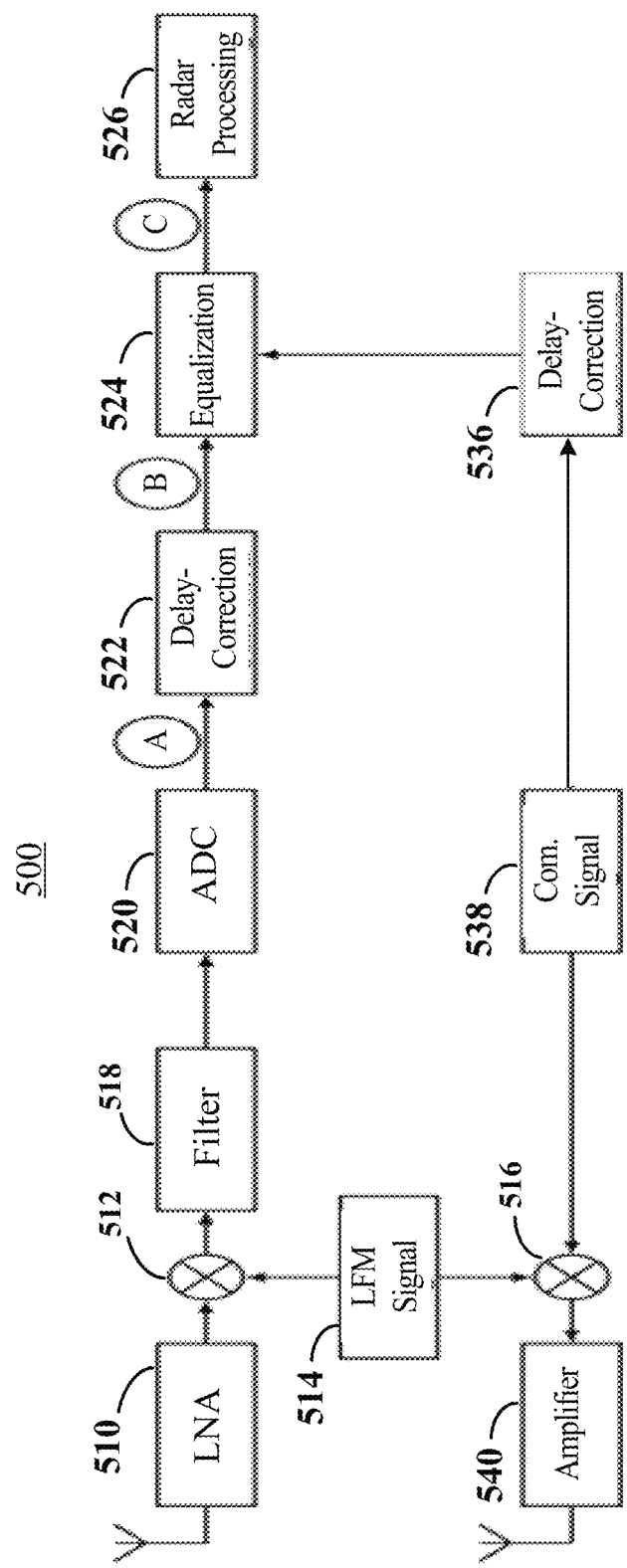
FIG. 5 is a radar system block diagram, in accordance with another example of the present disclosure.

In one such example consistent with the above more-detailed aspects, a circuit-based block diagram of a transceiver 500 is depicted in FIG. 5. Being a block diagram, the circuits or circuit-based blocks are intended to be generalized, and certain aspects (such as use of multiple antennas for radar-signal reception and transmission) are known and therefore not illustrated. The transceiver 500 includes a receive-signal circuit path in the upper portion of the diagram where the received radar signal is received via an antenna and processed by a low-noise amplifier (LNA) 510. Next, at mixer 512 the output of the LNA 510 is multiplied by a linear-frequency modulation (LFM) signal as generated at block 514 which is also used on the transmit side at mixer 516 in the transmit circuit path at the lower portion of the diagram.

The mixer 516 precedes transmission of the radar signal via an amplifier 540 and transmit antenna at the end of the transmit circuit path. A communication signal 538 that carries multiple bits, in this example, is embedded into the chirp before transmission. Thus, the same LFM signal is used in both the receive-signal circuit path and the transmit circuit path.

Referring again to the receive-signal circuit path, the output of the mixer 512 corresponds to the received radar signal as demodulated via the LFM signal 514, and this demodulated output is then filtered at filter 518 to capture only the relevant spectrum for the received radar signals. The filtered signal is then digitized by an ADC (analog to digital converter) 520. Further illustrated in the receive path are a first delay correction block 522, an equalization block 524, and circuitry 526 such as (other) aspects of a signal processor (e.g., including logic/CPU-based circuitry) for further processing of the processed radar signal. The equalization block 524 is responsive to an output from the first delay correction block 522 and to an output from a second delay correction block 536. In this regard, the equalization block 524 operates to account for the time delay associated with the relationship between beat frequency and time delay, by effectively and cleanly removing the information signal from the radar signal. Another output from the second delay correction block 536 is used as an input to the equalization circuit 524 to correct the communication signal before it is mixed with the LFM signal at mixer 516. At the output of the equalization circuit 524, the information signal has been removed and the radar signal has no residual error.

FIGS. 6A, 6B and 6C depict spectrograms of processed radar signals associated with an embedded information signal, as deramped after different processing steps, in accordance with the example shown in FIG. 5. FIG. 6A shows the two signals in the frequency spectrum, FIG. 6B shows the time delays being equalized, and FIG. 6C shows the information signal being removed. More specifically, at point A shown in the upper pathway of FIG. 5 and associated with FIG. 6A, the signal at the output of the ADC 520 is the summation of two signals (for the arbitrary case of two reflectors). Each signal is centered at its intermediate frequency occupying a part of the spectrum according to the bit rate. Moreover, each signal experiences a different time delay. At point B which is associated with FIG. 6B and at the output of the first delay correction circuit 522, the time delays have been equalized, but the signal still occupies a spectrum according to the communication bandwidth.

At point C which is associated with FIG. 6C and at the output of the equalization block 524, the information signal has been removed. As the information signal is removed, the signal occupies only a sinusoidal signal and the beat frequency remains.

According to certain simulation experiments consistent with the above-discussed experimental examples, the performance of the joint radar and communication system has been validated using a Range-Doppler plot for two targets at different distances and different velocities, and with the effect of an embedded communication signal (Gaussian Minimum Shift Keying) for the same scenario being recorded. The communication signal causes an increase of the noise floor in the vicinity of the actual target range and along the entire Doppler axis. The performance is improved by aligning and equalization of the communication signal as both targets can be recognized in the range-Doppler plot but an increase in the noise floor, especially around the closer target, can still be observed. If the delay correction is also applied to the reference communication signal, this effect can be suppressed further.

Terms to exemplify orientation, such as arrows or data shown flowing from left to right, or from top to bottom, or in opposite directions may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, logic (circuitry), signal processing circuitry and/or other circuit-type depictions (e.g., as in FIG. 1 and FIG. 5 which depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing, for example, the named first activity and the named second activity, and in another example, the logic circuitry may carry out a process or method by performing one or more of these activities/operations alone, in combination with one or additional other such activities/operations.

For example, in certain of the above-discussed embodiments, one or more modules are discrete logic circuits or programmable logic circuits configured and arranged for implementing these operations/activities, as may be carried out in the approaches shown in FIGS. 1 and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described, may be used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
   receiver circuitry to receive a frequency modulated continuous wave (FMCW) radar signal having a content signal embedded into a radar waveform and having a relationship between beat frequency and time delay; and
   signal processing circuitry to apply a filter to account for the time delay, the application of the filter causes a residual error in the content signal, and the signal processing circuitry to account for the residual error by introduction of a dispersion-related function in further processing of the content signal, the signal processing circuitry comprising:
   a first delay correction circuit,
   a second delay correction circuit different from the first correction delay circuit, and
   an equalization circuit having a first input coupled to an output of the first delay correction circuit and a second input coupled to the output of the second delay correction circuit.

2. The apparatus of claim 1, wherein the content signal is embedded into a radar waveform by phase modulation, and wherein the filter is an all-pass filter that is associated with a group delay that approximates or relates to the relationship between beat frequency and time delay.

3. The apparatus of claim 2, wherein the signal processing circuitry is to account for the time delay by mitigation or removal of the time delay and is to account for the residual error by mitigation or removal of the residual error.

4. The apparatus of claim 1, wherein the first delay correction circuit to provide a processed signal to account for the time delay while noise associated with the content signal remains in the processed signal, and the equalization circuit responsive to an output signal from the first delay correction circuit and to an output signal from the second delay correction circuit to account for the residual error and to facilitate removal of the noise associated with the content signal from the radar signal.

5. The apparatus of claim 1, wherein the content signal is embedded into a radar waveform by continuous phase modulation.

6. The apparatus of claim 1, wherein in response to accounting for the residual error, the signal processing circuitry is to carry out further radar signal processing of a processed version of the received FMCW radar signal.

7. The apparatus of claim 1, wherein the content signal refers to or includes an information signal, and wherein the signal processing circuitry is to respond to or interpret the information signal.

8. The apparatus of claim 1, wherein the content signal refers to or includes a random signal.

9. The apparatus of claim 1, wherein the content signal refers to or includes a signal to improve robustness of the receiver circuitry to interference.

10. The apparatus of claim 1, further including an all-pass filter to respond to the signal processing circuitry by removing the embedded content signal, wherein the all-pass filter is to remove the embedded content signal in the time domain.

11. The apparatus of claim 10, wherein the all-pass filter is to have a linear group delay.

12. The apparatus of claim 10, wherein the all-pass filter is to have a linear group delay and a response that is nonlinear which causes the dispersion of the communication signal in an alignment process associated with or ensuing from application of the filter.

13. The apparatus of claim 1, further including a radar-signal transmitter, wherein the signal processing circuitry is to provide an alignment through use of an all-pass filter that has a linear group delay associated with the time delay, and, in response to accounting or mitigating for the residual error, the signal processing circuitry is to carry out further radar signal processing of the received FMCW radar signal.

14. A method comprising:
via receiver circuitry, receiving a FMCW radar signal having a content signal embedded into a radar waveform and indicating a relationship in the FMCW radar signal between beat frequency and time delay; and
via signal processing circuitry,
applying a filter and processing by way of a first delay correction circuit to account for the time delay, the application of the filter causing a residual error in the content signal, and
accounting for the residual error by way of an equalization circuit responsive to an output signal from the first delay correction circuit and to an output signal from a second delay correction circuit different from the first delay correction circuit of a dispersion-related function in further processing of the content signal.

15. The method of claim 14, wherein the content signal refers to or includes at least one or combination of the following: an information signal; a random signal; and a signal to maintain robustness of the receiver in presence of interference.

16. The method of claim 14, wherein the signal processing circuitry removes the embedded content signal after providing an alignment through use of an all-pass filter that has a linear group delay, and, in response to applying the filter and accounting for the residual error, the signal processing circuitry carries out further radar signal processing of the received FMCW radar signal.

17. The method of claim 14, wherein the signal processing circuitry is to account for the residual error and/or the dispersion, by dividing the received FMCW radar signal by a dispersed version of a reference signal corresponding to the content signal.

18. The method of claim 14, wherein applying of a filter includes using an all-pass filter to account for the time delay.

19. The method of claim 14, further including using an all-pass filter as part of an alignment process, wherein the all-pass filter operates on the received radar signal in the time domain.

20. The method of claim 14, further including dividing the received signal by the dispersed reference communication signal, and wherein the content signal is embedded into a radar waveform of the FMCW radar signal by phase modulation.

* * * * *